United States Patent [19]
Brown

[11] Patent Number: 4,998,799
[45] Date of Patent: Mar. 12, 1991

[54] STEREOSCOPE

[76] Inventor: Dennis L. Brown, 328 Stow Rd., Harvard, Mass. 01451

[21] Appl. No.: 445,424

[22] Filed: Dec. 4, 1989

[51] Int. Cl.⁵ .............................................. G02B 27/22
[52] U.S. Cl. ................................................. 350/133
[58] Field of Search ....................... 350/132, 133, 140

[56] References Cited

U.S. PATENT DOCUMENTS

| | | |
|---|---|---|
| 933,844 | 9/1909 | Kellner . |
| 1,169,163 | 1/1916 | Kellner . |
| 2,313,562 | 3/1943 | Mainardi . |
| 4,021,846 | 5/1977 | Roese . |
| 4,027,947 | 6/1977 | Taylor . |
| 4,160,581 | 7/1979 | Weissler . |

FOREIGN PATENT DOCUMENTS 3439724  4/1986  Japan ................................. 350/133

Primary Examiner—Bruce Y. Arnold
Assistant Examiner—Rebecca D. Gass
Attorney, Agent, or Firm—Blodgett & Blodgett

[57] ABSTRACT

A stereoscope for viewing two stereoscopically complementary pictures which are positioned one above the other. The stereoscope includes a housing which has left and right front openings at the front of the housing and upper and lower rear openings at the back of the housing. A passageway leads from the left front opening to one of the rear openings and from the right front opening to the other rear opening. Optical elements, such as mirrors, are located within the passageways for directing a light image from one of the pictures through one of the rear openings to the left front opening and for directing a light image from the other picture through the other rear opening to the right front opening so that the observer sees the two images as superimposed and perceives the superimposed images as a single 3-dimensional picture.

8 Claims, 6 Drawing Sheets

STEREOSCOPE

BACKGROUND OF THE INVENTION

The present invention is generally directed to a stereoscope for helping an observer to combine the images of two 2-dimensional photographs taken from two points of view to obtain the effect of depth.

The development of stereoscopes has had a long history. One of the first stereoscopes did not require mirrors or prisms. The stereoscope was a box which had an aperture for each eye and a single aperture on the opposite side. The observer had to cross his or her eyes in order to perceive the two pictures as a single picture. This made stereoscopic viewing very difficult and resulted in considerable eye strain. Later stereoscopes employed various combinations of mirrors and lenses for viewing pictures taken with stereo cameras. The typical stereo camera has two lenses which are spaced 2.5 inches apart, which is the same spacing as for the average adult human eyes and takes two pictures at the same time. This close lens spacing limits the stereo effect to a relatively short distance. One recent stereo camera employs four lenses and prints are produced which do not require the use of a separate stereoscope. However, the quality of the pictures are not good because of a special plastic grating, (a flat stereoscope) which must be placed on the prints and the cost of print processing is considerably higher than for ordinary 35 mm. prints.

Conventional stereo viewers include lenses which cause the eyes to focus at infinity with no inward rotation. The pictures to be viewed are placed left and right. In order to see the stereograph, the pictures must be placed at a precise distance from the lenses. The position of the pictures must be adjusted for individual variations and eye spacing. Conventional stereoscopes are relatively complex optical devices which require adjustments for variations in eye spacing. These and other difficulties experienced with prior art stereoscopes have been obviated by the present invention.

It is, therefore, the principle object of the invention to provide a stereoscopic viewer for enabling an observer to obtain the effect of depth by combining images of two photographic prints taken sequentially from two points of view by a conventional camera, or at the same time from a pair of cameras.

Another object of this invention is the provision of a stereoscope which enables the observer to combine the images of two photographic prints and enables the observer to naturally converge and comfortably focus on the combined image at the normal distance for viewing photographs.

A further object of the present invention is the provision of a stereoscopic viewer which does not require any adjustment for variations in the eye spacing and which can be used by children and adults.

It is another object of the present invention to provide a stereoscopic viewer which can combine the images of two photographs of the same scene taken from two points of view by positioning one photograph above the other.

A still further object of the invention is the provision of a stereoscopic viewer which is simple in construction, easy to manufacture and relatively inexpensive.

Another object of the invention is to provide a stereoscopic viewer for photographs taken by a conventional camera which is easy to use and which does not require any additional equipment.

It is a further object of the invention to provide a stereoscopic viewer for pairs of pictures for 3D viewing which are generated by "conceptual" cameras such as with artwork which is produced by artists and designers and computers.

With these and other objects in view, as will be apparent to those skilled in the art, the invention resides in the combination of parts set forth in the specification and covered by the claims appended hereto.

SUMMARY OF THE INVENTION

In general, the invention consists of a stereoscope for viewing two stereoscopically complementary pictures which are positioned one above the other. The stereoscope consists of a housing for the purpose of providing structural support and to mask out unwanted images, having left and right windows in the front for the eyes of the observer and upper and lower windows in the rear of the housing. Optical means are located within the housing for receiving a first light image from one of the pictures through one of the rear windows and for directing the first light image to the left front window. The optical means also receive a second light image from the other picture through the other rear window and direct the second light image to the right front window. More specifically, the optical means may consist of two pairs of reflecting surfaces; one pair of reflecting surfaces for the left eye opening and one of the rear openings, and the other pair for the right eye opening and the other rear opening. Other configurations are possible using mirrors, prisms or light pipes!

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
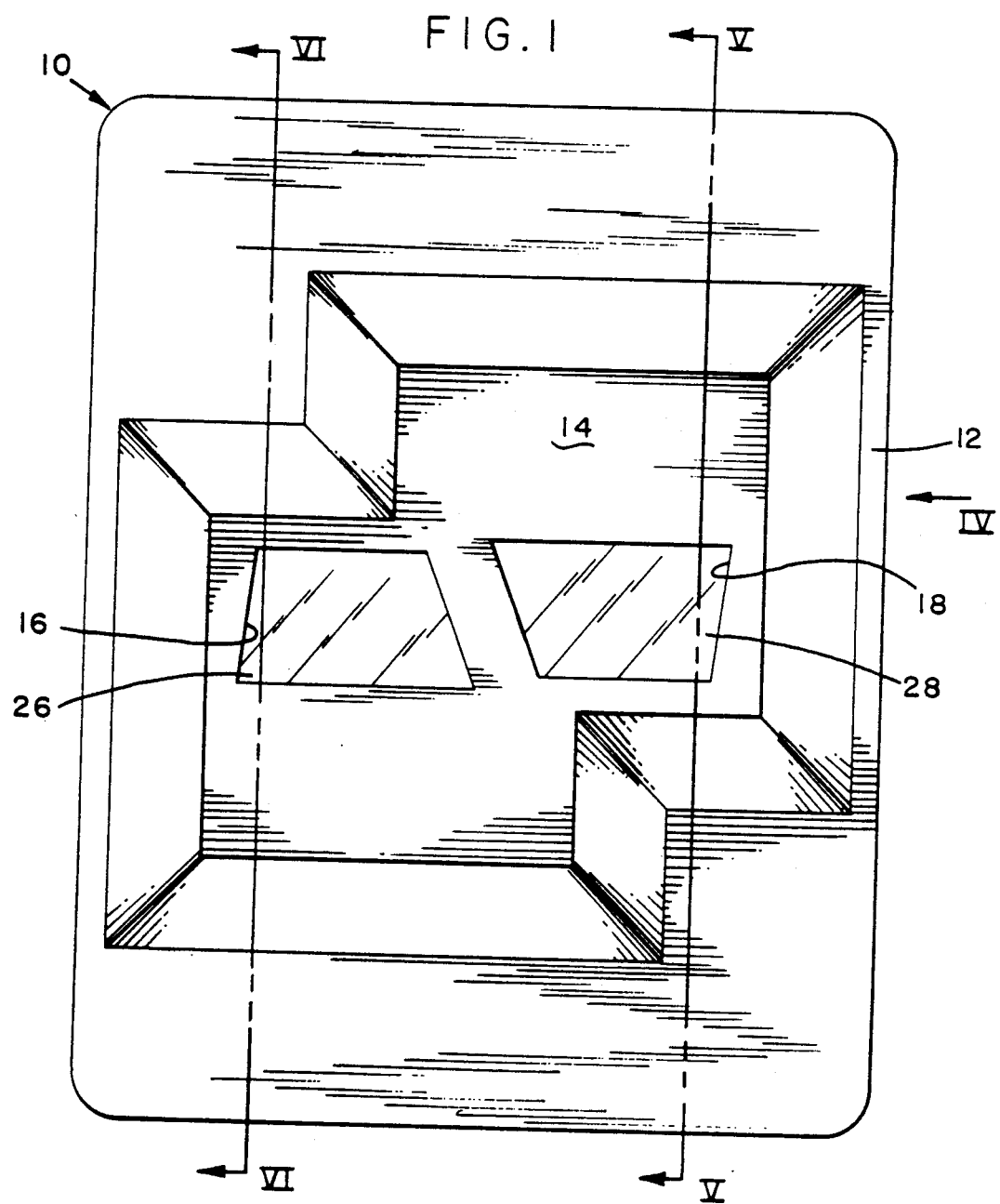
FIG. 1 is a front elevational view of a stereoscope embodying the principles of the present invention.
Figure 2:
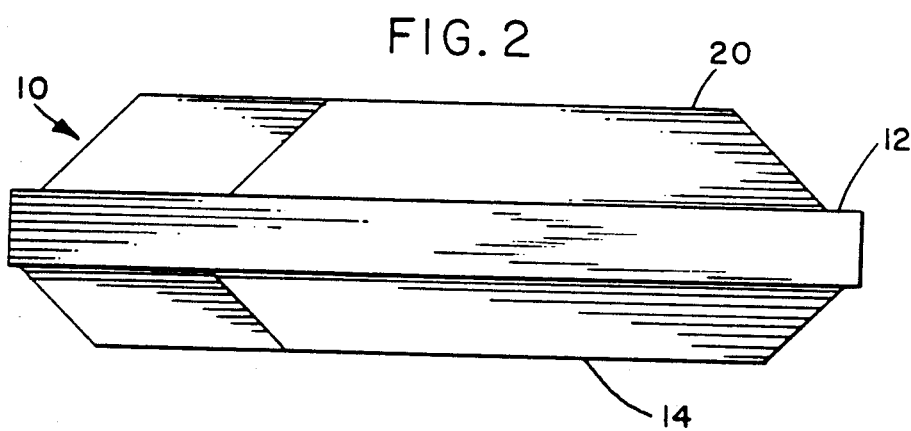
FIG. 2 is a plane view of the stereoscopic.
Figure 3:
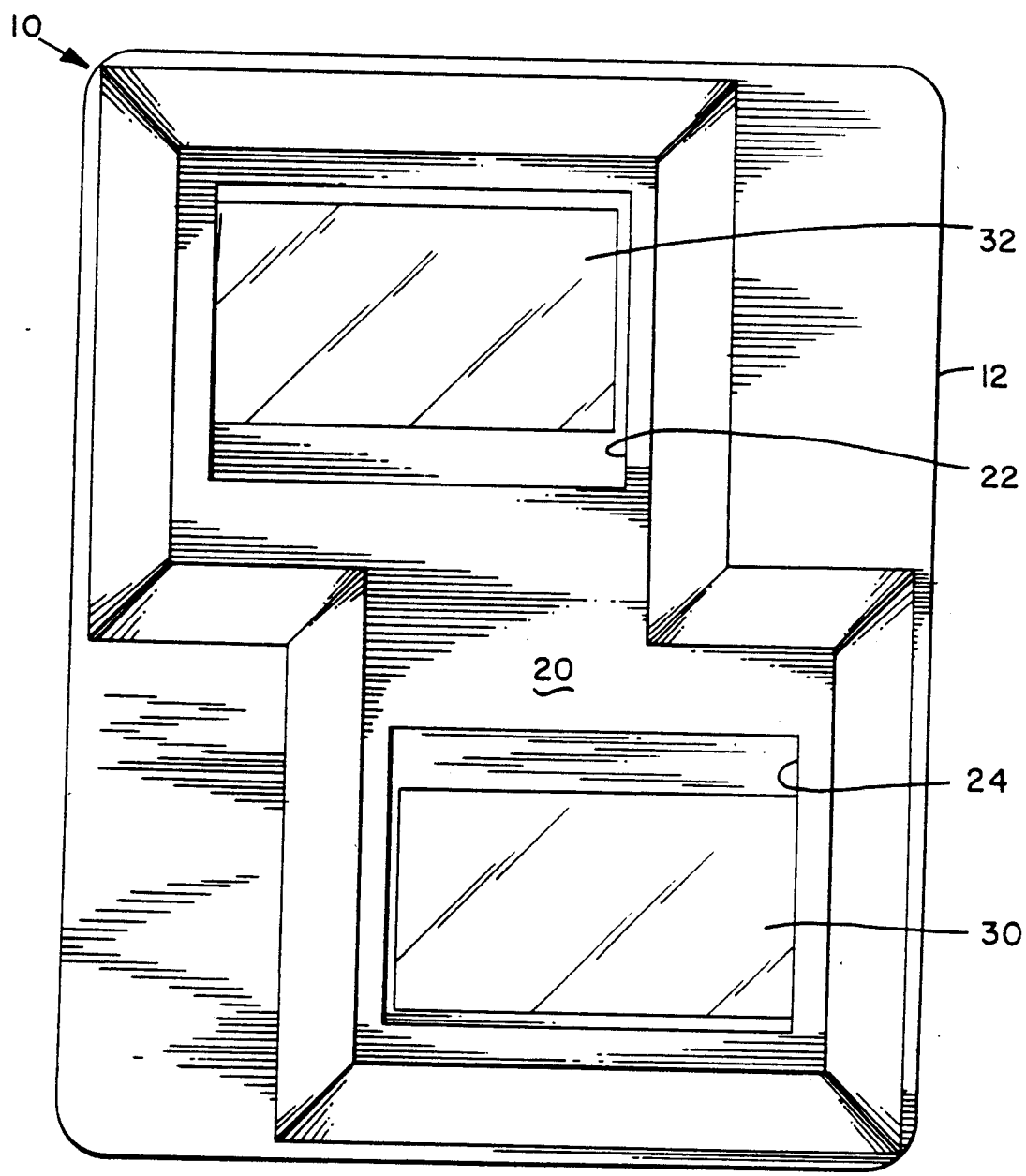
FIG. 3 is a rear elevational view of the stereoscope.
Figure 4:
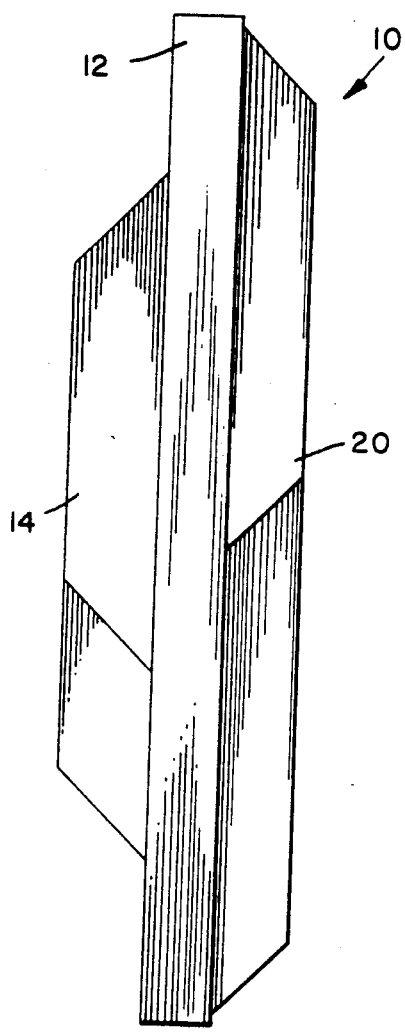
FIG. 4 is a side elevational view of the stereoscope looking in the direction of arrow IV of FIG. 1.

Referring first to FIGS. 1–3, a stereoscope embodying the principles of the present invention is generally indicated by the reference numeral 10 and comprises a housing 12 which has a front surface 14 and a back surface 20. The front surface 14 has a left front opening 16 and a right front opening 18. The back surface 20 has an upper rear opening 22 and a lower rear opening 24.

Figure 6:
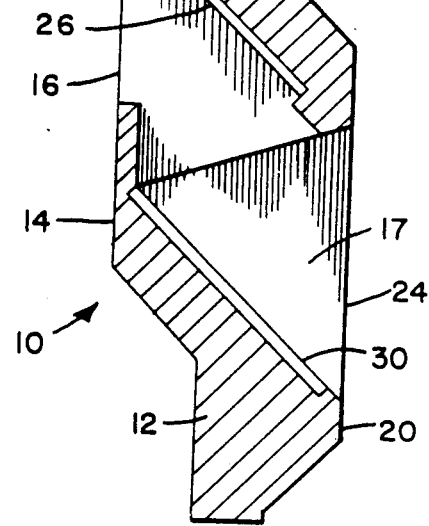
FIG. 6 is a vertical cross-sectional view of the stereoscope taken along the line VI—VI of FIG. 1 and looking in the direction of the arrows.
Figure 5:
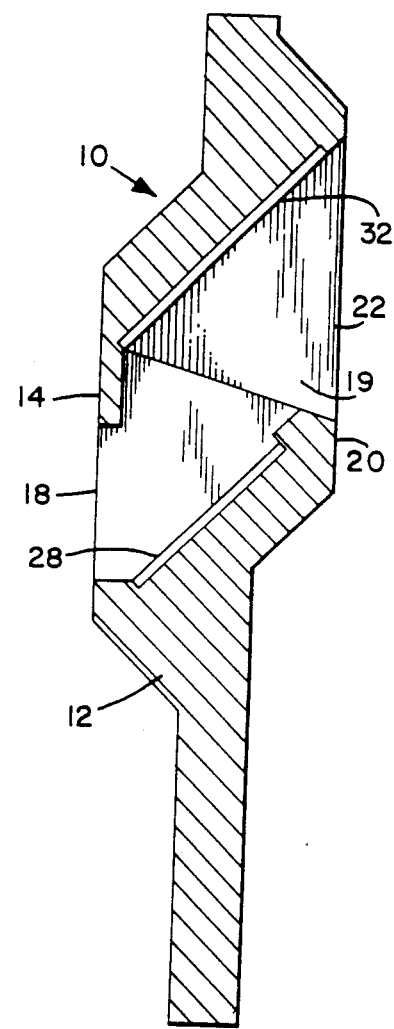
FIG. 5 is a vertical cross-sectional view of the stereoscope taken along the line V—V of FIG. 1, and looking in the direction of the arrows.

Referring particularly to FIGS. 5 and 6, the housing 12 includes a channel 17 which extends from the left front opening 16 to the lower rear opening 24 as shown in FIG. 6. A channel 19 extends from the right front opening 18 to the upper rear opening 22 as shown in FIG. 5. A first front mirror 26 is located in the channel 17 at an angle to the vertical. The first front mirror 26 is optically aligned with the left front opening 16 so that it can be viewed through the left front opening 16. A first rear mirror 30 is located in the channel 17 at an angle to the vertical. The mirror 30 is optically aligned with the lower rear opening 24 so that it can be seen through the opening 24 and is optically aligned with the first front mirror 26. The reflecting faces of the mirrors 26 and 30 are parallel with each other as shown in FIG. 6. A second front mirror 28 is located in the channel 19 at an angle to the vertical. The second front mirror 28 is optically aligned with the right front opening 18 so that it can be seen through the front opening 18. A second rear mirror 32 is located in the channel 19 at an angle to the vertical. The second rear mirror 32 is optically aligned with the upper rear opening 22 so that it can be seen through the rear opening 22 and is optically aligned with the second front mirror 28. The reflecting surfaces of the mirrors 28 and 32 are parallel with each other as shown in FIG. 5.

Figure 7:
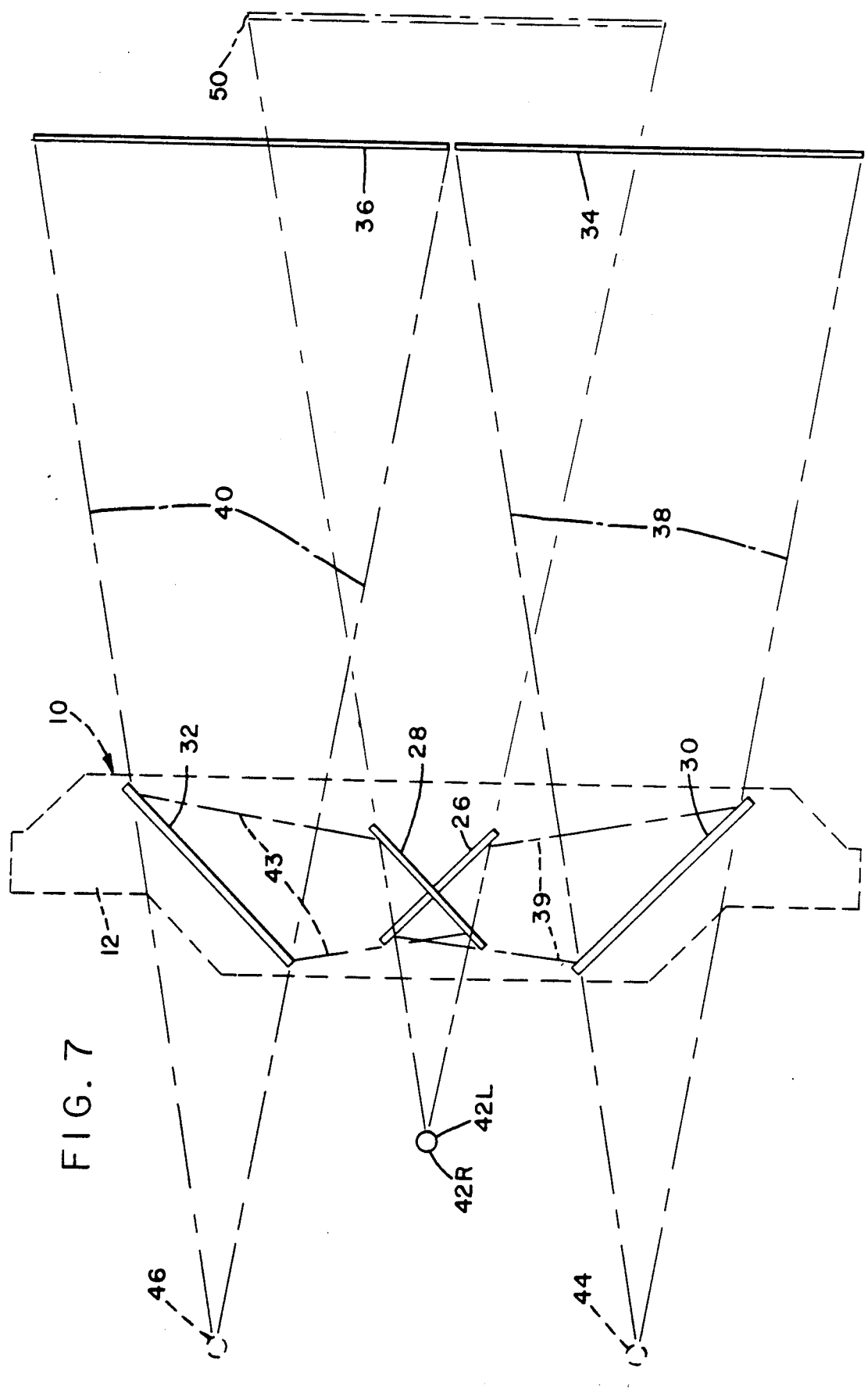
FIG. 7 is a diagrammatic side elevational view of the displacement of the mirrors which form the optics for the stereoscope.
Figure 8:
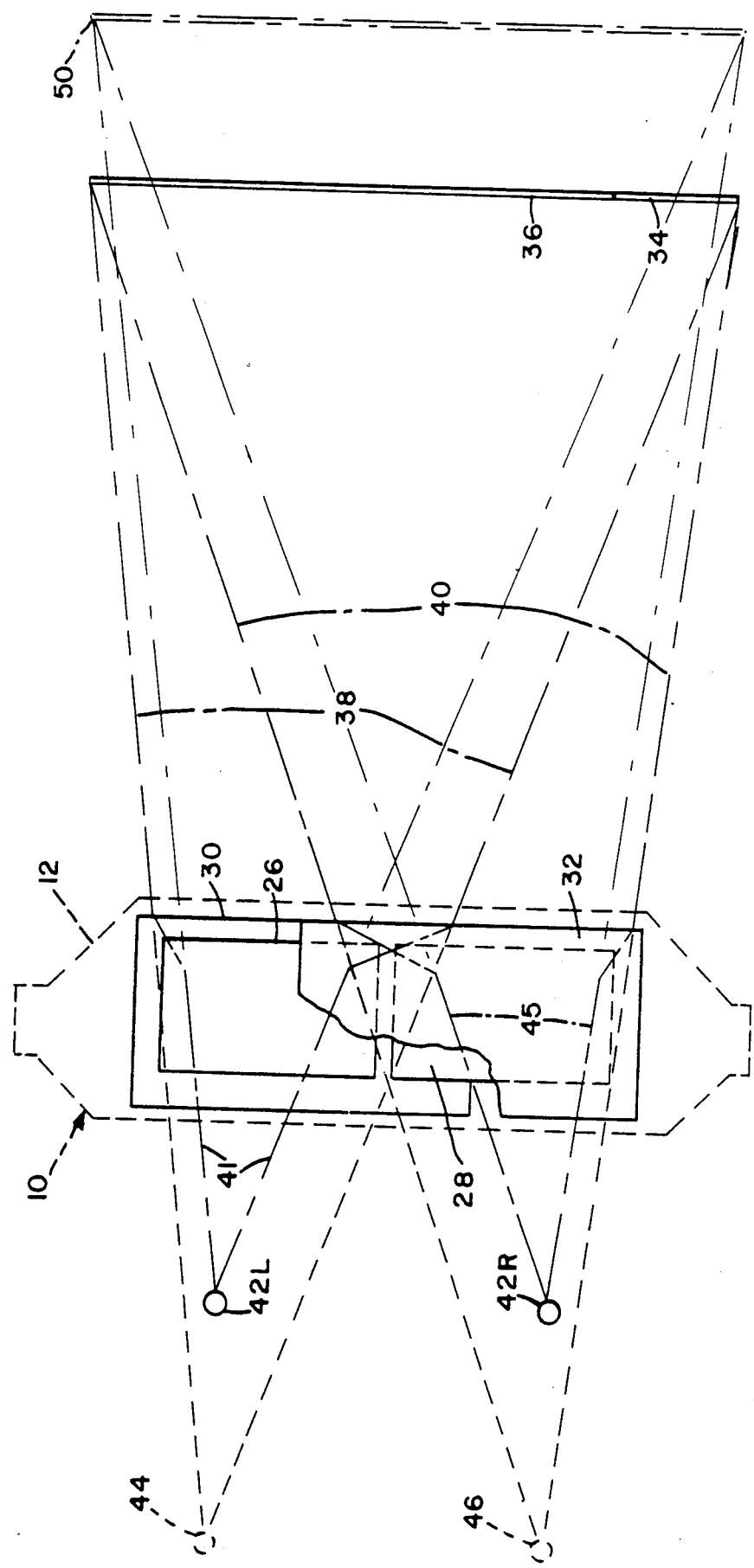
FIG. 8 is a diagrammatic plane view of the displacing of the mirrors for the stereoscope.
Figure 9:
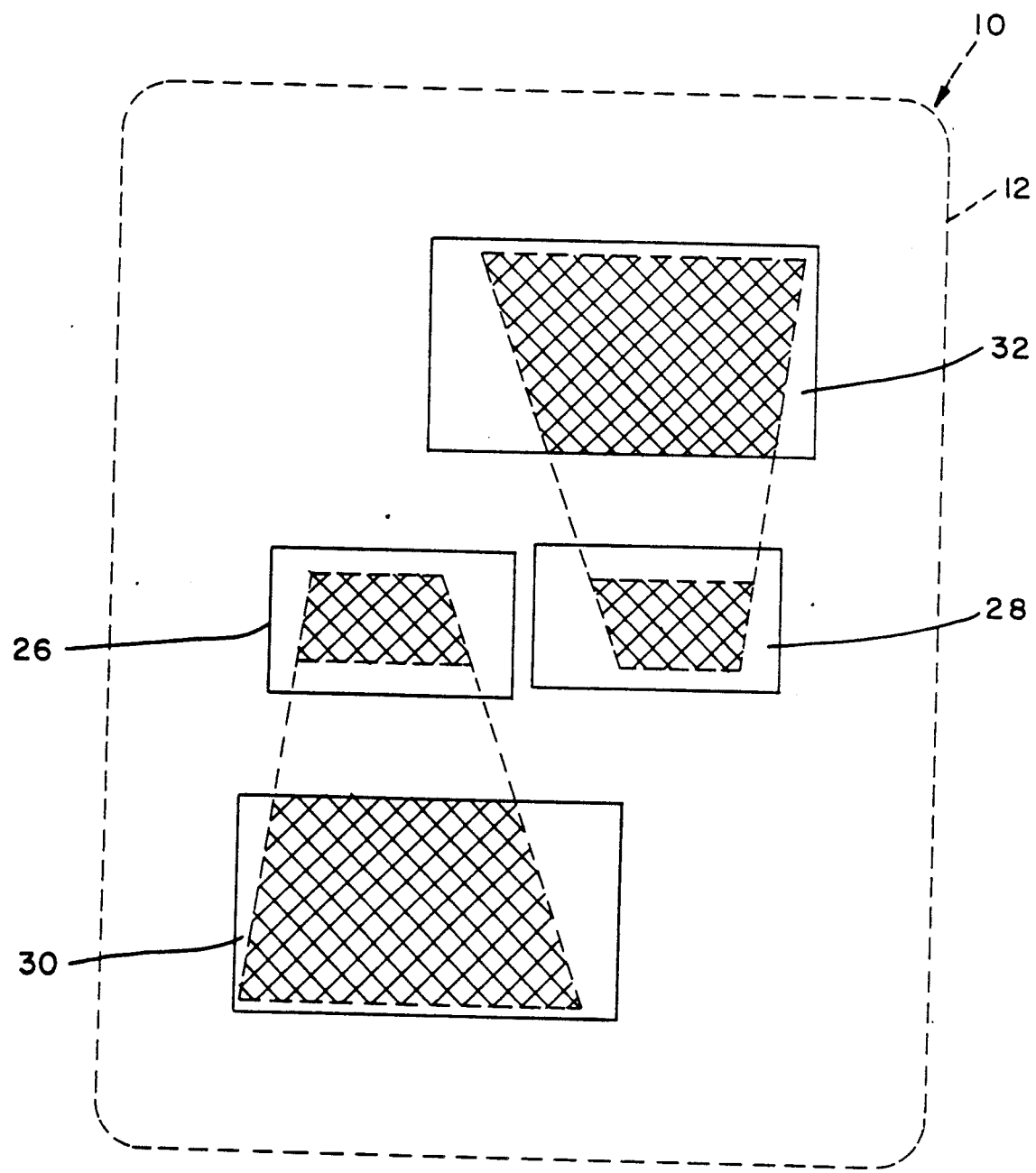
FIG. 9 is a diagrammatic front elevational view of the displacement of the mirrors for the stereoscope.

The optics of the stereoscope 12 are diagrammatically illustrated in FIGS. 7-9. The stereoscope 10 is designed for optically combining the images of two stereoscopically complementary photographic prints. The prints are of the same scene but taken from two different points of view. The first print, indicated by the reference numeral 34, shows a scene from a left point of view. The second print, indicated by the reference numeral 36, shows the same scene from a right point of view. The prints 34 and 36 are arranged in the same vertical plane with the print 36 directly above the print 34 as shown in FIGS. 7 and 8. The stereoscope 10 is positioned in front of the prints 36 and 34 so that the second rear mirror 32 is in optical alignment with the print 36 and the first rear mirror 30 is in optical alignment with the print 34. The path of the visual image from the first print 34 extends between the dot-and-dash lines 38 through the lower rear opening 24 to the reflective surface of the first rear mirror 30. The path of the image which is reflected from the reflective surface of the mirror 30 to the reflective surface of the mirror 26 extends between the dot-and-dash lines 39. The image is reflected a second time from the reflective surface of the first front mirror 26 through the left front opening 16 along the path which is bounded by the dot-and-dash lines 41 to a left eye position 42L. The image from the photographic print 36 extends along a path which is bounded by the dot-and-dash lines 40 through the upper rear opening 22 to the reflective surface of the mirror 32. The image is reflected from the mirror 32 to the reflective surface of the mirror 28 along a path which is bounded by the dot-and-dash lines 43. The image is then reflected from the reflective surface of the mirror 28 through the right front opening 18 along a path which is bounded by the dot-and-dash lines 45 to a right eye position 42R. The left and right eye positions 42L and 42R are horizontally spaced as shown in FIG. 8, but are at the same vertical level which is midway between the prints 34 and 36 as shown in FIG. 7. The horizontal distance between the positions 42L and 42R is equal to the normal spacing between the eyes of a human being. However, each mirror of the stereoscope 10 is of sufficient width to accommodate all of the variations in eye spacing for adults and children. During stereoscopic viewing, the stereoscope 10 is held in front of the pictures 34 and 36 at the normal distance of 10 to 20 inches for viewing 3×5 photographs. Larger and smaller photographic prints can also be viewed. The larger prints must be overlapped vertically to some extent, and smaller prints must be vertically separated. The mirror system of the stereoscope 10 brings the images from the prints 34 and 36 to the same horizontal level to accommodate the eyes of the observer. The eyes of the observer actually converge between the prints 34 and 36. The eyes focus as if they were at the imaginary virtual eye positions 44 and 46. The image from the print 34 is seen by the observer's left eye at the position indicated by the dot and dash line 50. The image from the print 36 is also seen by the observer's right eye at the position indicated by dot and dash line 50. The observer sees the image from the print 34 superimposed on the image from the print 36 as if they were both at the position 50. The observer's brain interprets the combined images as a single 3-dimensional image since the image which enters the left eye is from the print 34 which is taken from a left point of view and the image which enters the right eye is from the print 36 which is taken from a right point of view.

The optics of the sterescope 10 are specifically arranged for viewing two 3×5 photographic prints oriented one above the other as shown in FIGS. 7 and 8. The actual dimensions of a 3×5 photographic print are 3 and ½ by 5 inches. This size print is the most common and represents an intermediate size. The particular arrangement of the mirror system within the stereoscope 10 corresponds with the positioning of the two stereo photographs one above the other instead of in a side by side arrangement as is the case for prior art stereoscopic viewers. This allows the images to be superimposed on top of each other without the need for sidewise shifting of the image or adjustment for eye spacing. Since the photographs are already in vertical alignment, the only remaining task of the mirrors is to bring the image of the left eye print up and the image of the right eye print down, thereby placing the images at the same vertical level. The stereoscope 10 functions as a double periscope. The benefits of the present invention are obtained when the arrangement of the mirrors are such so as to provide a 3D effect when viewing a pair of 3D pictures which have at least some vertical alignment. However, it is preferred to have the mirror arranged for viewing two 3D pictures in which one picture is directly above the other. This is the most efficient form of the invention and the easiest to use by the observer. No guess work is required for aligning the prints and the prints may be permanently arranged in a 3-D album so that they make the maximum use of space.

Clearly, minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desire to secure by Letters Patent is:

1. A stereoscope for viewing two stereoscopically complementary pictures which are positioned in the same vertical plane so that one picture is substantially above the other and the two pictures are at least partially vertically aligned, said stereoscope comprising:

(a) a housing having a front and a back,
(b) a left front window at the front of said housing,
(c) a right front window at the front of said housing which is horizontally spaced from said left front window and is at substantially the same height as said left front window,
(d) an upper rear window at the back of said housing,
(e) a lower rear window at the back of said housing which is substantially below said upper rear window,
(f) first optical means within said housing operatively connecting one of said rear windows to said left front window for receiving a first light image from one of said pictures through one rear window and for directing said first light image to said left front window, and
(g) optical means within said housing operatively connecting the other of said rear windows to said right front window for receiving a second light images from the other of said pictures through said other rear window and for directing said second light image to said right front window.

2. A stereoscope as recited in claim 1, wherein said front windows are in the same vertical plane and said rear windows are in the same vertical plane.

3. A stereoscope as recited in claim 2, wherein at least a portion of said upper and lower rear windows are vertically aligned.

4. A stereoscope as recited in claim 1, wherein said first optical means comprises:
(a) a first rear mirror which is optically aligned with said one rear window,
(b) a first front mirror which is optically aligned with said first rear mirror and said left front window, and wherein said second optical means comprises:
(c) a second rear mirror which is optically aligned with said other rear window, and
(d) a second front mirror which is optically aligned with said second rear window and said right front window.

5. A stereoscope as recited in claim 1, wherein said first optical means comprises:
(a) a first rear mirror which extends at an angle to the vertical and which is optically aligned with said one rear window, and
(b) a first front mirror which is at an angle to the vertical so that it is optically aligned with said first rear mirror and said left front window, and wherein said second optical means comprises:
(c) a second rear mirror which extends at an angle to the vertical and which is optically aligned with said other rear window, and
(d) a second front mirror which is at an angle to the vertical so that it is optically aligned with said second rear mirror and said right front window, 6. A stereoscope for viewing two stereoscopically complementary pictures which are positioned in the same vertical plane so that one picture is substantially above the other and the two pictures are at least partially vertically aligned, said stereoscope comprising:
(a) a housing having a front and a back,
(b) a left front window at the front of said housing in said front surface,
(c) a right front window at the front of said housing which is in substantially the same vertical plane as said left front window, said right front window being substantially to the right of said left front window, and being substantially horizontally aligned with said left front window,
(d) an upper rear window at the back of said housing,
(e) a lower rear window at the back of said housing which is substantially below said upper rear window,
(f) a left channel which extends from said left front window to one of said rear window openings,
(g) a right channel which extends from said right front window to the other of said rear windows,
(h) first optical means in said left channel for receiving a first light image from one of said pictures and for directing said first light image to said left front window, and
(i) second optical means within said right channel for receiving a second light image from the other of said pictures and for directing said second light image to said right front window, 7. A stereoscope as recited in claim 6, wherein at least portions of said upper and lower rear windows are vertically aligned.

8. A stereoscope as recited in claim 7, wherein said first optical means comprises:
(a) a first rear mirror which is optically aligned with said one rear window, and
(b) a first front mirror which is optically aligned with said first rear mirror and said left front window, and wherein said second optical means comprises:
(c) a second rear mirror which is optically aligned with said other rear window, and
(d) front mirror which is optically aligned with said second rear mirror and said right front window.

* * * * *